United States Patent
Kwon

(10) Patent No.: US 10,028,142 B2
(45) Date of Patent: Jul. 17, 2018

(54) APPARATUS AND METHODS FOR CHANNEL ACCESS IN WLAN

(71) Applicant: NEWRACOM, Inc., Irvine, CA (US)

(72) Inventor: Young Hoon Kwon, Laguna Niguel, CA (US)

(73) Assignee: NEWRACOM, INC., Irvine, CA (US)

( * ) Notice: Subject to any disclaimer, the term of this patent is extended or adjusted under 35 U.S.C. 154(b) by 59 days.

(21) Appl. No.: 15/134,755

(22) Filed: Apr. 21, 2016

(65) Prior Publication Data

US 2016/0316472 A1 Oct. 27, 2016

Related U.S. Application Data

(60) Provisional application No. 62/184,187, filed on Jun. 24, 2015, provisional application No. 62/150,783, filed on Apr. 21, 2015.

(51) Int. Cl.
*G08C 17/00* (2006.01)
*H04W 12/06* (2009.01)
(Continued)

(52) U.S. Cl.
CPC .......... *H04W 12/06* (2013.01); *H04L 5/0037* (2013.01); *H04L 5/0044* (2013.01);
(Continued)

(58) Field of Classification Search
CPC ... H04W 12/06; H04W 74/002; H04W 74/02; H04W 88/08; H04W 84/12;
(Continued)

(56) References Cited

U.S. PATENT DOCUMENTS

2015/0341961 A1* 11/2015 Kim .................. H04W 74/0808
370/338
2016/0119881 A1* 4/2016 Merlin ................ H04W 52/146
370/328
(Continued)

OTHER PUBLICATIONS

IEEE Std 802.Nov. 2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Clemence S Han
(74) *Attorney, Agent, or Firm* — Nicholson De Vos Webster & Elliott LLP

(57) ABSTRACT

A method implemented by an Access Point (AP) in a Wireless Local Area Network (WLAN) to facilitate an unassociated station (STA) to participate in an uplink multi-user simultaneous transmission. The method includes receiving a request frame from the unassociated STA and generating a response frame, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access. The method further includes transmitting the response frame to the unassociated STA through a wireless medium.

17 Claims, 9 Drawing Sheets

(51) Int. Cl.
*H04L 5/00* (2006.01)
*H04W 74/00* (2009.01)
*H04B 7/0452* (2017.01)
*H04W 84/12* (2009.01)
*H04W 88/08* (2009.01)
*H04W 74/02* (2009.01)

(52) U.S. Cl.
CPC ......... *H04L 5/0055* (2013.01); *H04W 74/002* (2013.01); *H04B 7/0452* (2013.01); *H04L 5/0005* (2013.01); *H04L 5/005* (2013.01); *H04W 74/02* (2013.01); *H04W 84/12* (2013.01); *H04W 88/08* (2013.01)

(58) Field of Classification Search
CPC ... H04L 5/0037; H04L 5/0044; H04L 5/0055; H04L 5/0005; H04L 5/005; H04B 7/0452
See application file for complete search history.

(56) References Cited

U.S. PATENT DOCUMENTS

| | | | | |
|---|---|---|---|---|
| 2016/0128102 A1* | 5/2016 | Jauh | .................. | H04W 74/0833 370/329 |
| 2016/0173377 A1* | 6/2016 | Rong | .................... | H04W 74/04 370/392 |
| 2016/0183305 A1* | 6/2016 | Huang | .............. | H04W 74/0833 370/329 |
| 2016/0198500 A1* | 7/2016 | Merlin | ................ | H04W 76/021 370/329 |
| 2016/0219522 A1* | 7/2016 | Asterjadhi | ........ | H04W 52/0274 |
| 2016/0227533 A1* | 8/2016 | Josiam | ................ | H04W 74/006 |
| 2016/0241411 A1* | 8/2016 | Huang | .................. | H04L 12/189 |
| 2016/0269993 A1* | 9/2016 | Ghosh | ............... | H04W 52/0229 |
| 2016/0302232 A1* | 10/2016 | Ghosh | ................ | H04W 74/0833 |
| 2017/0367118 A1* | 12/2017 | Choi | .................. | H04W 74/0816 |
| 2018/0014316 A1* | 1/2018 | Guo | .................... | H04W 72/121 |
| 2018/0084575 A1* | 3/2018 | Ghosh | ................. | H04W 74/004 |

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

* cited by examiner

APPARATUS AND METHODS FOR CHANNEL ACCESS IN WLAN

CROSS-REFERENCE TO RELATED APPLICATIONS

This application claims the benefit of U.S. Provisional Application No. 62/150,783, filed Apr. 21, 2015, and U.S. Provisional Application No. 62/184,187, filed Jun. 24, 2015, which are hereby incorporated by reference.

FIELD OF INVENTION

The embodiments of the invention are related to the field of Wireless Local Area Network (WLAN) operation. More specifically, the embodiments of the invention relate to a method and apparatus for allowing random access to transmission resources in a WLAN. Other embodiments are also disclosed.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called IEEE 802.11ax, High Efficiency WLAN (HEW) standardization is under discussion. The HEW aims at improving performance felt by users demanding high-capacity and high-rate services. The HEW may include the capability to handle multiple simultaneous transmissions in both the spatial and frequency domains, in both the uplink (UL) and downlink (DL) directions.

In dense WLAN environments, an AP needs to manage a large number of associated STAs in an efficient way, even under severe OBSS interference. One such way to support a large number of STAs in dense WLAN environments is to utilize multi-user (MU) simultaneous transmission/reception. Multi-user simultaneous transmission/reception may be achieved by utilizing Orthogonal Frequency Division Multiple Access (OFDMA) and Multi-User Multiple-Input-Multiple-Output (MU-MIMO) transmissions.

SUMMARY

The embodiments provide a method implemented by an Access Point (AP) in a Wireless Local Area Network (WLAN) to facilitate an unassociated station (STA) to participate in an uplink multi-user simultaneous transmission. The method includes receiving a request frame from the unassociated STA and generating a response frame, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access. The method further includes transmitting the response frame to the unassociated STA through a wireless medium.

The embodiments provide a network device to function as an Access Point (AP) in a Wireless Local Area Network (WLAN) to facilitate an unassociated station (STA) to participate in an uplink multi-user simultaneous transmission. The network device includes a Radio Frequency (RF) transceiver, a set of one or more processors, and a non-transitory machine-readable medium having stored therein a random access module, which when executed by the set of one or more processors, causes the network device, when functioning as the AP, to receive a request frame from the unassociated STA and generate a response frame, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access. The random access module, when executed by the network device further causes the network device, when functioning as the AP, to transmit the response frame to the unassociated STA through a wireless medium.

The embodiments provide a non-transitory machine-readable storage medium having computer code stored therein that is to be executed by a set of one or more processors of a network device functioning as an Access Point (AP) in a Wireless Local Area Network (WLAN) to facilitate an unassociated station (STA) to participate in an uplink multi-user simultaneous transmission. The computer code, when executed by the network device functioning as the AP, causes the network device to receive a request frame from the unassociated STA and generate a response frame, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access. The computer code, when executed by the network device functioning as the AP, further causes the network device to transmit the response frame to the unassociated STA through a wireless medium.

The embodiments provide a method implemented by a station (STA) in a Wireless Local Area Network (WLAN) to participate in an uplink multi-user simultaneous transmission to an Access Point (AP), where the STA is an unassociated STA with respect to the AP. The method includes transmitting a request frame to the AP through a wireless medium and receiving a response frame from the AP, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access.

The embodiments provide a network device to function as a station (STA) in a Wireless Local Area Network (WLAN) to participate in an uplink multi-user simultaneous transmission to an Access Point (AP), where the STA is an unassociated STA with respect to the AP. The network device includes a Radio Frequency (RF) transceiver, a set of one or more processors, and a non-transitory machine-readable medium having stored therein a random access module, which when executed by the set of one or more processors, causes the network device, when functioning as the STA, to transmit a request frame to the AP through a wireless medium and receive a response frame from the AP, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access.

The embodiments provide a non-transitory machine-readable storage medium having computer code stored therein that is to be executed by a set of one or more processors of a network device functioning as a station (STA) in a Wireless Local Area Network (WLAN) to participate in an uplink multi-user simultaneous transmission to an Access Point (AP), where the STA is an unassociated STA with respect to the AP. The computer code, when executed by the network device functioning as the STA, causes the network device to transmit a request frame to the AP through a wireless medium and receive a response frame from the AP, where the response frame includes timing information regarding a future transmission, by the AP, of a trigger frame. The trigger frame includes scheduling information for scheduling an uplink multi-user simultaneous transmission, where at least one transmission resource unit allocated for the uplink multi-user simultaneous transmission allows random access.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
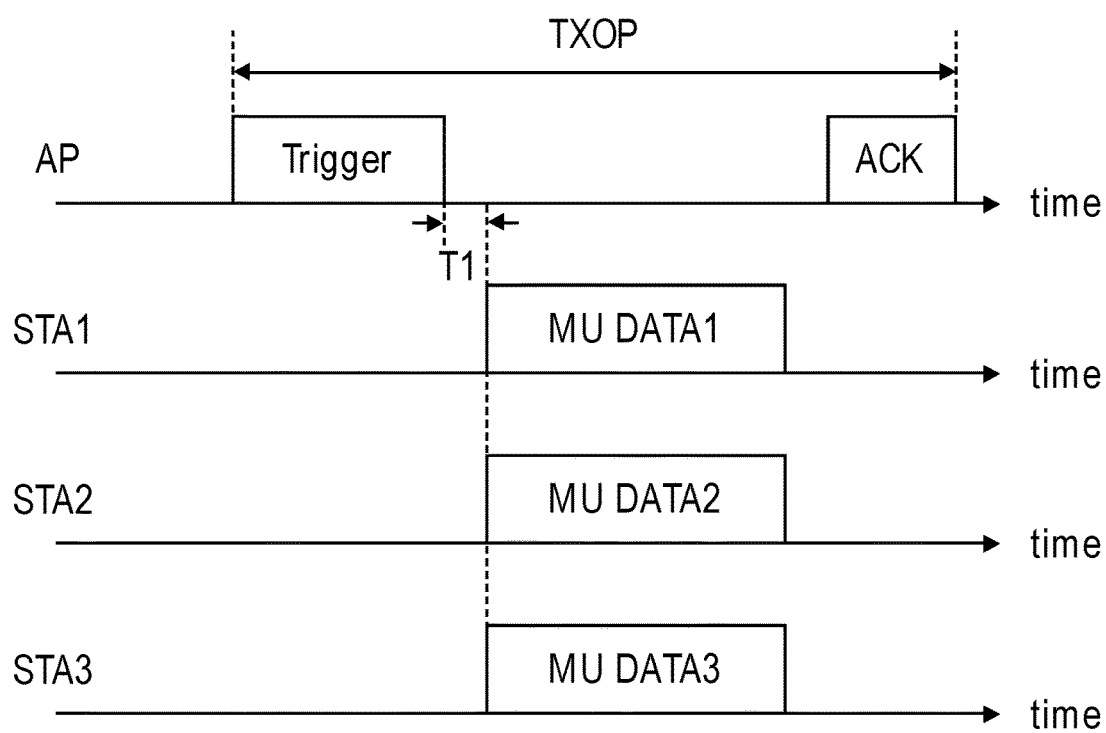
FIG. 1 is a diagram illustrating operations of an uplink multi-user simultaneous transmission, according to some embodiments.

The embodiments disclosed herein provide a method and apparatus for allowing random access to transmission resources in a Wireless Local Area Network (WLAN). An embodiment is a method that utilizes the concept of random access to facilitate an unassociated station (STA) to participate in an uplink multi-user simultaneous transmission. Other embodiments are also described and claimed.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a wireless local area network (WLANs). STAs are devices connected to and communicating in a WLAN including client or user devices that connect to the WLAN via APs. APs are network devices that may be specialized wireless access points that can communicate with other network devices in the WLAN via the wireless medium or via wired connections. A STA or AP may be referred to herein as a WLAN device.

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW may support uplink (UL) multi-user (MU) simultaneous transmission, which includes uplink Multi-User Multiple-Input Multiple-Output (MU-MIMO) and uplink Orthogonal Frequency Division Multiple Access (OFDMA) transmissions.

FIG. 1 is a diagram illustrating operations of an uplink multi-user simultaneous transmission, according to some embodiments. A WLAN may include an AP and a group of STAs (e.g., STA1, STA2, and STA3). The AP may initiate an uplink multi-user simultaneous transmission in the WLAN by transmitting a trigger frame (e.g., Trigger) in a multicast/broadcast manner such that all of the intended participants of the uplink multi-user simultaneous transmission can receive and decode the trigger frame. The trigger frame serves to schedule an uplink multi-user simultaneous transmission. For this purpose, the trigger frame may include scheduling information for scheduling the uplink multi-user simultaneous transmission such as information regarding the intended participants of the uplink multi-user simultaneous transmission (the participating STAs) and information regarding the assignment of transmission resources (e.g., wireless channels) to the participating STAs. After a predetermined time (T1) from receiving the trigger frame, the participating STAs transmit their respective uplink frames (e.g., MU DATA 1, MU DATA 2, MU DATA 3) to the AP. Since all of the participating STAs receive the trigger frame essentially simultaneously and since all of the participating STAs use the same delay (T1) before transmitting their respective uplink frames to the AP, the uplink transmission time of all of the participating STAs can be synchronized, and thus, the AP can receive the uplink frames transmitted by the participating STAs in a synchronized manner. If the AP successfully receives and decodes the uplink frames transmitted by the participating STAs, the AP may transmit an acknowledgement frame (e.g., ACK) to the participating STAs.

For the AP to determine proper scheduling (e.g., resource allocation) for an uplink multi-user simultaneous transmission, the AP needs to know the buffer status and related Quality of Service (QoS) information for each STA. If a STA is already being served by the AP, this information can be piggybacked onto ongoing uplink frame transmissions. However, in some scenarios, it is possible that an AP may need to schedule uplink multi-user simultaneous transmission for a STA that does not have an ongoing uplink frame transmission. If a STA does not have an ongoing uplink frame transmission, then the STA may need to transmit its buffer status and related QoS information to the AP separately, for example, in a single-user transmission. However, this can consume a significant amount of transmission resources (e.g., wireless channels), which negatively impacts the performance of the WLAN. One solution for this problem is to make a given transmission resource allocated for an uplink multi-user simultaneous transmission available to more than one STA.

According to some embodiments, a trigger frame may schedule an uplink multi-user simultaneous transmission such that a given transmission resource allocated for the uplink multi-user simultaneous transmission is made available to more than one STA. Any of the STAs that satisfy certain conditions, if any (e.g., the STA has uplink data to transmit, the STA is associated with the serving AP, etc.), may then use the given transmission resource during the uplink multi-user simultaneous transmission to transmit an uplink frame to the AP. In other words, there is no 1:1 assignment of transmission resources to STAs. This concept where a transmission resource is made available to more than one STA is referred to herein as "random access". As used herein, a transmission resource allocated for an uplink multi-user simultaneous transmission is said to allow random access if it is made available to more than one STA such that any one of those STAs (e.g., that satisfy certain conditions, if any) can use the given transmission resource during the uplink multi-user simultaneous transmission. As used herein, an uplink multi-user simultaneous transmission is said to allow random access if one or more transmission resources allocated for the uplink multi-user simultaneous transmission allow random access.

Figure 2:
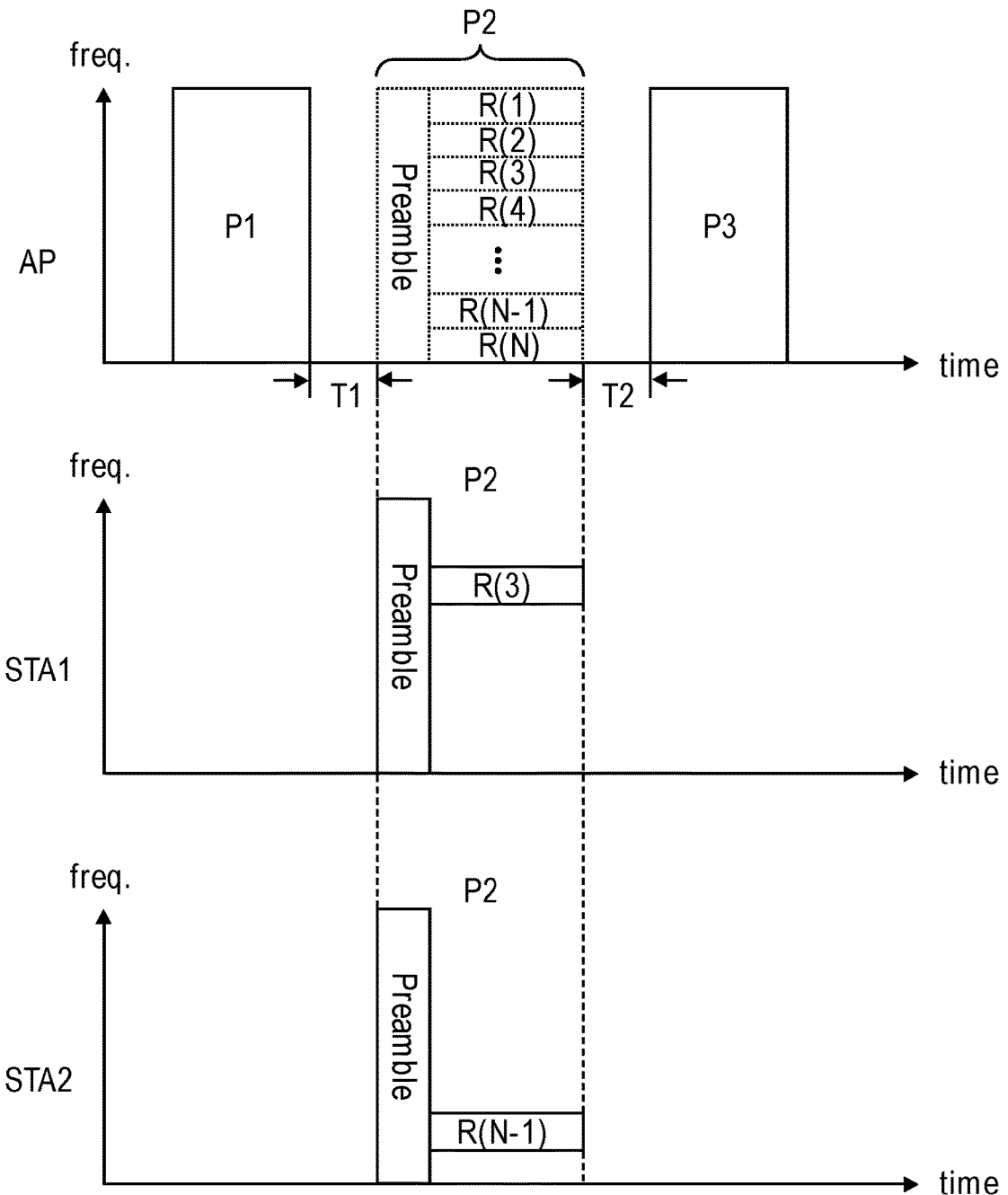
FIG. 2 is a diagram illustrating operations of an uplink multi-user simultaneous transmission that allows random access, according to some embodiments.

FIG. 2 is a diagram illustrating operations of an uplink multi-user simultaneous transmission that allows random access, according to some embodiments. A WLAN may include an AP and a group of STAs (e.g., STA1, STA2, and other STAs). As shown in the diagram, the AP transmits a trigger frame (P1) to the group of STAs. The trigger frame serves to schedule an uplink multi-user simultaneous transmission. For this purpose, the trigger frame includes scheduling information for scheduling the uplink multi-user simultaneous transmission. The scheduling information may include information regarding the transmission resources allocated for the uplink multi-user simultaneous transmission. In this example, N transmission resources (R(1), R(2), . . . , R(N−1), and R(N)) are allocated for the uplink multi-user simultaneous transmission, where each of the N transmission resources allows random access. It should be noted that with the concept of random access, a 1:1 assignment of transmission resources to STAs is not required. In other words, a given transmission resource can be made available to more than one STA (e.g., the group of STAs) for use during the uplink multi-user simultaneous transmission. As such, more than one STA within the group of STAs can potentially attempt to use the given transmission resource during the uplink multi-user simultaneous transmission. The scheduling information may further include other information related to the uplink multi-user simultaneous transmission such as information regarding the Modulation Coding Scheme (MCS) level for encoding the uplink frames and/or information regarding the transmission length of the uplink multi-user simultaneous transmission.

After receiving the trigger frame transmitted by the AP, each of the STAs within the group of STAs that has buffered data transmits an uplink frame (P2) (e.g., including a preamble followed by buffered data) to the AP using one of the transmission resources allocated for the uplink multi-user simultaneous transmission after a predetermined time (T1) from receiving the trigger frame. In this example, since each of the transmission resources allows random access, each STA that has buffered data can choose which transmission resource to use for transmitting its uplink frame during the uplink multi-user simultaneous transmission. In this example, STA1 and STA2 have buffered data to transmit during the uplink multi-user simultaneous transmission. As shown, STA1 chooses to use transmission resource R(3) and STA2 chooses to use transmission resource R(N−1) for transmitting their respective uplink frames during the uplink multi-user simultaneous transmission. In one embodiment, a STA may include information in its uplink frame that helps the AP schedule a future uplink multi-user simultaneous transmission (e.g., this information may include the STA's buffer status and related QoS information).

After receiving the respective uplink frames transmitted by one or more STAs (STA1 and STA2 in this example) during the uplink multi-user simultaneous transmission, the AP transmits an acknowledgement frame (P3) after a predetermined time (T2) from receiving the uplink frames (assuming that the AP successfully receives and decodes the uplink frames). The acknowledgement frame serves to acknowledge the uplink frames transmitted by the one or more STAs.

In this way, the concept of random access makes a transmission resource available to more than one STA and allows any one of those STAs that have buffered data to transmit an uplink frame during an uplink multi-user simultaneous transmission. Random access may be particularly helpful when the AP does not have prior information regarding which STAs have buffered data to transmit. In this case, the AP may schedule an uplink multi-user simultaneous transmission that allows random access, which allows STAs that have buffered data to transmit their buffered data during the uplink multi-user simultaneous transmission. This can save a significant amount of transmission resources (e.g., wireless channels) in the WLAN. For example, random access can be used to give STAs an opportunity to transmit buffer status and related QoS information to the AP during an uplink multi-user simultaneous transmission in a random access manner. This may help increase the performance of the WLAN, particularly when the number of transmission resources allocated is smaller than the number of STAs.

With the concept of random access, there is a possibility that multiple STAs choose to use the same transmission resource during an uplink multi-user simultaneous transmission, which may cause collisions. There can be several ways to handle these collision scenarios. In one embodiment, a STA may transmit its uplink data frame after obtaining the transmission right. In another embodiment, a STA may transmit another round of uplink request frame after obtaining the transmission right. In yet another embodiment, a STA may wait to receive another trigger frame from the AP.

In one embodiment, a trigger frame that schedules an uplink multi-user simultaneous transmission includes an indicator that has at least two states. The first state indicates that all of the transmission resources allocated for the uplink multi-user simultaneous transmission allow random access. Thus, a STA that receives a trigger frame with the indicator set to the first state may transmit an uplink frame during the uplink multi-user simultaneous transmission using a transmission resource that is chosen in a random (or quasi-random) manner. The second state indicates that the trigger frame includes information regarding the assignment of transmission resources to STAs. When the indicator is set to the first state, the payload size of the trigger frame can be reduced since individual information per transmission resource (e.g., assigned STA and MCS level per transmission resource) is not needed in the trigger frame. At the same time, by setting the indicator to the second state, the trigger frame can schedule a normal uplink multi-user simultaneous transmission, where transmission resources are assigned to particular STAs (e.g., not random access).

As previously mentioned, a trigger frame (e.g., P1) serves to schedule an uplink multi-user simultaneous transmission. For this purpose, the trigger frame may include scheduling information for scheduling an uplink multi-user simultaneous transmission. In one embodiment, the scheduling information includes information regarding the transmission resources allocated for the uplink multi-user simultaneous transmission. In one embodiment, the assignment of transmission resources to STAs and the MCS level assigned to each transmission resource is not explicitly indicated in the scheduling information, which indicates that random access of transmission resources is allowed. In another embodiment, the scheduling information includes explicit indication of random access resources. In one embodiment, the default MCS level, when the MCS level is not assigned to a transmission resource, is a modulation level of Quadrature Phase Shift Keying (QPSK) and a code rate of 1/2. In one embodiment, the scheduling information includes an indication that the assignment of transmission resources to STAs is not explicitly indicated in the scheduling information, which indicates that random access of transmission resources is allowed. In one embodiment, the assignment of transmission resources to STAs is predetermined as a function of the number of allocated transmission resources and the position of each STA within a list of a group of STAs.

In one embodiment, the scheduling information includes an indication that a STA may choose any transmission resource from the transmission resources allocated for the uplink multi-user simultaneous transmission. In one embodiment, the scheduling information includes an indication that a STA can choose a transmission resource from the transmission resources allocated for the uplink multi-user simultaneous transmission randomly. In one embodiment, the scheduling information includes an indication that a STA should choose a transmission resource from the transmission resources allocated for the uplink multi-user simultaneous transmission that corresponds to the STA's preferred transmission resource.

In one embodiment, the scheduling information includes an indication that more than one transmission resource is allocated for the uplink multi-user simultaneous transmission and that the amount of bandwidth allocated for each transmission resource is the minimum unit of bandwidth that can be allocated to a transmission resource. In one embodiment, the minimum unit of bandwidth includes 26 subcarriers, where 24 of the 26 subcarriers are data subcarriers and 2 of the 26 subcarriers are pilot subcarriers. In one embodiment, the scheduling information includes an indication of the channel bandwidth of the uplink multi-user simultaneous transmission. In one embodiment, there are 9 transmission resources if the channel bandwidth of the uplink multi-user simultaneous transmission is 20 MHz. In one embodiment, there are 18 transmission resources if the channel bandwidth of the uplink multi-user simultaneous transmission is 40 MHz. In one embodiment, there are 37 transmission resources if the channel bandwidth of the uplink multi-user simultaneous transmission is 80 MHz. In one embodiment, there are 74 transmission resources if the channel bandwidth of the uplink multi-user simultaneous transmission is 160 MHz.

In one embodiment, the scheduling information includes an indication that there is no restriction on the access category of buffered data that can be transmitted by a STA in an uplink frame during the uplink multi-user simultaneous transmission. In one embodiment, the scheduling information includes an indication of one or more access categories of buffered data that a STA may transmit in an uplink frame during the uplink multi-user simultaneous transmission.

In one embodiment, the time delay between reception of the trigger frame and transmission of the uplink frame is Short Interframe Space (SIFS) time, as defined in IEEE 802.11 standard.

An uplink frame (e.g., P2) serves to carry data in the uplink direction (e.g., from a STA to an AP). In one embodiment, a STA includes, in an uplink frame it transmits to the AP during the uplink multi-user simultaneous transmission, a first feedback information that is useful for the AP to determine scheduling for future uplink transmissions. In one embodiment, the STA includes the buffer status information of the STA as part of the first feedback information. In one embodiment, the buffer status information of the STA is included in the MAC header, such as the QoS Control field, of the Media Access Control (MAC) Protocol Data Unit (MPDU) of the uplink frame. In one embodiment, the physical layer payload part of an uplink frame that a STA transmits during an uplink multi-user simultaneous transmission occupies the transmission resource assigned to the STA, as indicated by the scheduling information included in the trigger frame that scheduled the uplink multi-user simultaneous transmission.

In one embodiment, a STA transmits an uplink frame during the uplink multi-user simultaneous transmission if all of the STA's buffered data can be transmitted within the transmission length of the uplink multi-user simultaneous transmission (e.g., which may be indicated by the scheduling information included in a trigger frame that scheduled the uplink multi-user simultaneous transmission). In one embodiment, a STA transmits buffer status information of the STA and some of its buffered data during the uplink multi-user simultaneous transmission if it can be transmitted within the transmission length of the uplink multi-user simultaneous transmission. In one embodiment, the buffer status information includes an indication of a STA's preferred transmission resource for uplink transmission. In one embodiment, the buffer status information includes an indication of the STA's preferred MCS and/or the STA's preferred number of spatial streams for uplink transmission. In one embodiment, the buffer status information includes an indication of the STA's preferred transmission bandwidth for uplink transmission.

In one embodiment, a STA includes, in an uplink frame it transmits to the AP during the uplink multi-user simultaneous transmission, a second feedback information that is useful for the AP to determine scheduling for future downlink transmissions. In one embodiment, the second feedback information includes an indication of the STA's preferred transmission resource for downlink transmission. In one embodiment, the second feedback information includes an indication of a STA's preferred MCS and/or the STA's preferred number of spatial streams for downlink transmission. In one embodiment, the second feedback information includes an indication of the STA's preferred transmission bandwidth for downlink transmission. In one embodiment, the STA only includes the second feedback information if the STA determines that the AP has buffered data for downlink transmission to the STA.

An acknowledgement frame (e.g., P3) serves to acknowledge one or more uplink frames received by the AP. In one embodiment, after receiving uplink frames from one or more STAs during an uplink multi-user simultaneous transmission, the AP transmits an acknowledgement frame, where the acknowledgement frame includes one or more identifiers that identify the one or more STAs from which the AP successfully received an uplink frame during the uplink multi-user simultaneous transmission. In one embodiment, the one or more identifiers that identify the one or more STAs from which the AP successfully received an uplink frame during the uplink multi-user simultaneous transmission are included in an MPDU of the acknowledgement frame. In one embodiment, the MPDU of the acknowledgement frame uses a Multi Traffic Identifier (Multi-TID) Block Acknowledgement frame format, as defined in IEEE 802.11 standard. In one embodiment, the acknowledgement frame includes scheduling information for scheduling an uplink multi-user simultaneous transmission from the STAs from which the AP successfully received an uplink frame during the previous uplink multi-user simultaneous transmission.

In one embodiment, an acknowledgement frame includes at least two independent MAC payloads, where the first MAC payload includes acknowledgement information for uplink frames received during the uplink multi-user simultaneous transmission and where the second MAC payload includes scheduling information for scheduling an uplink multi-user simultaneous transmission from the STAs from which the AP successfully received an uplink frame during the previous uplink multi-user simultaneous transmission.

In one embodiment, an AP transmits an acknowledgement frame using OFDMA, where the assignment of transmission resources to STAs corresponds to the assignment of transmission resources to STAs for the successfully received uplink frames. In one embodiment, the time delay between reception of the uplink frame and transmission of the acknowledgement frame is SIFS time, as defined in IEEE 802.11 standard.

In one embodiment, the random access technique described above or similar technique can be used to facilitate an unassociated STA to transmit a frame to the AP during an uplink multi-user simultaneous transmission. For example, an unassociated STA may want to transmit an uplink management frame (e.g., probe request frame, authentication frame, association request frame, etc.) to the AP. Conventionally, an unassociated STA transmits such frames to the AP using a single-user transmission, which consumes a significant amount of transmission resources. By allowing an unassociated STA to participate in an uplink multi-user simultaneous transmission that allows random access, the amount of single-user transmissions by an unassociated STA can be reduced, and thus further improve efficiency of the WLAN.

However, allowing unassociated STAs to participate in an uplink multi-user simultaneous transmission that allows random access may not be practical in some cases. For example, typically, an unassociated STA may want to first transmit a probe request frame to the AP before waiting for any downlink frames. As such, waiting for a trigger frame from the AP before transmitting the probe request frame to the AP may not be a reasonable solution. This may only be beneficial when an unassociated STA happens to receive the trigger frame from the AP when it needs to transmit a probe request frame.

Also, since an unassociated STA has not been assigned an Association Identification (AID), and an AP has no way of knowing whether the unassociated STA will transmit any follow-up frames to the probe request frame, it is difficult for the AP to determine whether transmission resources should be scheduled for the unassociated STA so that the unassociated STA can transmit follow-up frames.

Embodiments overcome the disadvantages of conventional techniques by providing an unassociated STA with timing information regarding future transmission of a trigger frame that schedules an uplink multi-user simultaneous transmission that allows random access. When an AP receives a request frame (e.g., probe request, authentication request, etc.) from an unassociated STA, the AP transmits a response frame to the unassociated STA that includes timing information regarding a future transmission, by the AP, of a trigger frame. The trigger frame includes scheduling information for scheduling an uplink multi-user simultaneous transmission, where at least one transmission resource allocated for the uplink multi-user simultaneous transmission allows random access. The timing information helps the unassociated STA determine when the AP will transmit the trigger frame in the future. After receiving the response frame, the unassociated STA may transition to a sleep state (e.g., power saving mode) until a time when the AP is expected to transmit the trigger frame, according to the timing information included in the response frame. The unassociated STA may transition to an awake state at the time when the AP is expected to transmit the trigger frame. At around this time, the AP transmits the trigger frame and the unassociated STA is able to receive the trigger frame that schedules the uplink multi-user simultaneous transmission. The unassociated STA may then transmit a follow-up frame to the AP during the uplink multi-user simultaneous transmission using the at least one transmission resource that allows random access. An advantage of this technique is that it allows an AP to efficiently schedule and control an uplink multi-user simultaneous transmission that allows an unassociated STA to participate in the uplink multi-user simultaneous transmission. Another advantage of this technique is that an unassociated STA can transition to a sleep state until the AP is expected to transmit the trigger frame, and thus power consumption of the unassociated STA is reduced. Yet another advantage of this technique is that an unassociated STA can avoid wireless medium contention (e.g., by reducing the amount of single-user transmissions), and thus WLAN efficiency is improved. Other advantages will be readily apparent from the descriptions provided herein.

Figure 3:
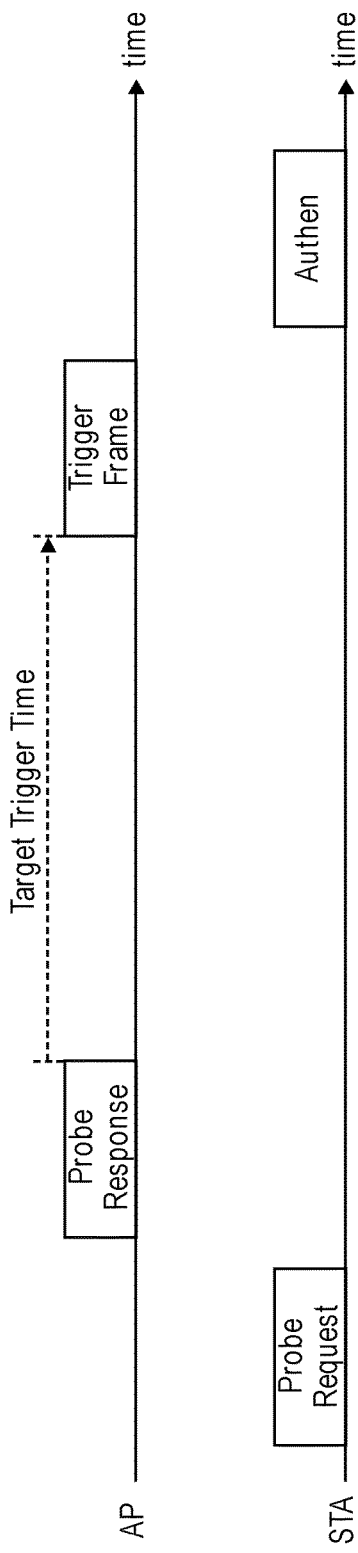
FIG. 3 is a diagram illustrating interactions between an AP and an unassociated STA for allowing the unassociated STA to participate in an uplink multi-user simultaneous transmission, according to some embodiments.

FIG. 3 is a diagram illustrating interactions between an AP and an unassociated STA for allowing the unassociated STA to participate in an uplink multi-user simultaneous transmission, according to some embodiments. The unassociated STA transmits a probe request frame to an AP in a unicast or broadcast manner. After the AP successfully receives and decodes the probe request frame, the AP transmits a probe response frame to the unassociated STA, where the probe response frame includes timing information regarding a next available trigger frame transmission that schedules an uplink multi-user simultaneous transmission that allows random access. The timing information may include an indication of a target trigger time (TTT). The TTT represents the time at which the AP will transmit a trigger frame that schedules an uplink multi-user simultaneous transmission that allows random access. After receiving the response frame, the unassociated STA may transition to a sleep state (e.g., power saving mode) until the TTT to save on power consumption. The unassociated STA then transitions to an awake state shortly before the TTT and monitors the wireless medium. The AP transmits a trigger frame at or around the TTT (as previously advertised in the probe response frame), where the trigger frame includes scheduling information for scheduling an uplink multi-user simultaneous transmission that allows random access. After the unassociated STA receives the trigger frame, the unassociated STA transmits an authentication frame (which is an example of a follow-up frame) during the uplink multi-user simultaneous transmission using a transmission resource from the transmission resources allocated for the uplink multi-user simultaneous transmission that allows random access. In one embodiment, after the AP successfully receives and decodes the authentication frame transmitted by the unassociated STA, the AP transmits its own authentication frame to the unassociated STA. In one embodiment, the authentication frame includes timing information regarding a next available trigger frame transmission that schedules another uplink multi-user simultaneous transmission that allows random access.

Figure 4:
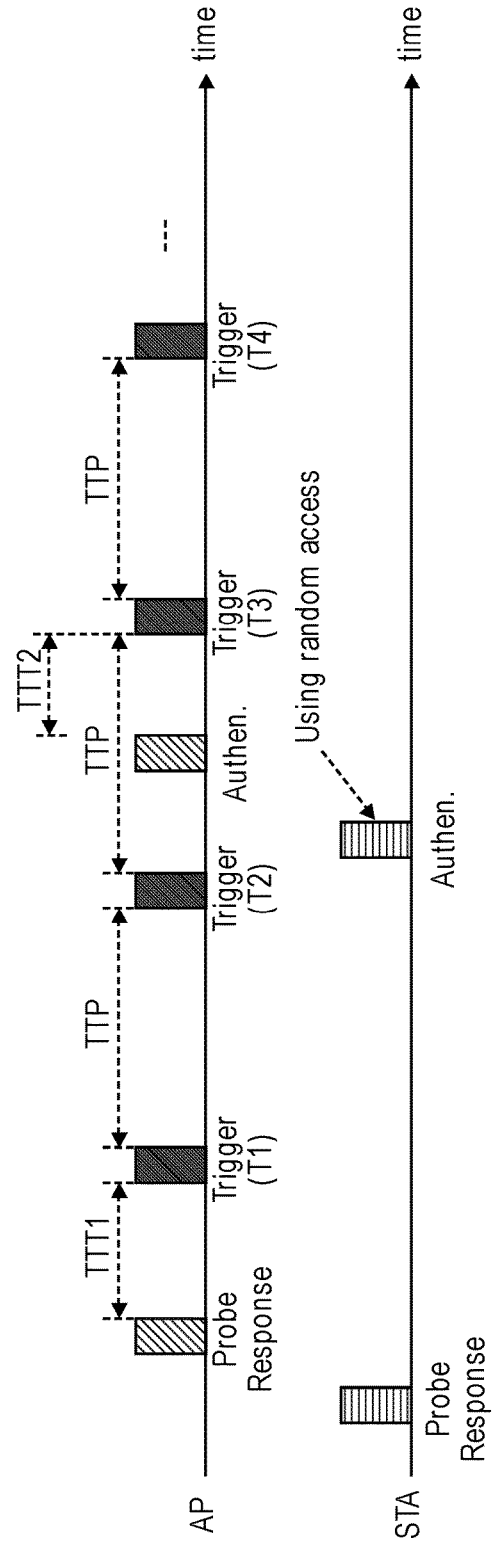
FIG. 4 is a diagram illustrating interactions between an AP and an unassociated STA for allowing the unassociated STA to participate in an uplink multi-user simultaneous transmission, according to some embodiments.

FIG. 4 is a diagram illustrating interactions between an AP and an unassociated STA for allowing the unassociated STA to participate in an uplink multi-user simultaneous transmission, according to some embodiments. In this example, the AP is configured to periodically transmit a trigger frame that schedules an uplink multi-user simultaneous transmission that allows random access (e.g., at times T1, T2, T3, and T4). The unassociated STA transmits a probe request to the AP in a unicast or broadcast manner. After the AP successfully receives and decodes the probe request frame, the AP transmits a probe response frame to the unassociated STA, where the probe response frame includes timing information regarding a next available trigger frame transmission that schedules an uplink multi-user simultaneous transmission that allows random access. The timing information may include an indication of a TTT (e.g., TTT1)

that represents the next time at which the AP will transmit a trigger frame (e.g., time T1) and an indication of a trigger frame transmission period (TTP) that represents the period of periodic trigger frame transmission by the AP. After receiving the probe response frame, the unassociated STA may transition to a sleep state (e.g., power saving mode) until TTT1 (e.g., time T1) or until another time at which the AP is expected to transmit a trigger frame (e.g., at time T2 (which is TTT1+TTP) to save on power consumption. In this example, the unassociated STA transitions to an awake state shortly before time T2 and monitors the wireless medium. The AP transmits a trigger frame at or around time T2 (as previously advertised in the probe response frame), where the trigger frame includes scheduling information for scheduling an uplink multi-user simultaneous transmission that allows random access. After the unassociated STA receives the trigger frame, the unassociated STA transmits an authentication frame (which is an example of a follow-up frame) during the uplink multi-user simultaneous transmission using a transmission resource from the transmission resources allocated for the uplink multi-user simultaneous transmission that allows random access. After the AP successfully receives and decodes the authentication frame, the AP transmits its own authentication frame to the unassociated STA, where this authentication frame may include timing information regarding a next available trigger frame transmission that schedules another uplink multi-user simultaneous transmission that allows random access (e.g., TTT2 and/or TTP).

In an embodiment where an AP is scheduled to transmit a plurality of trigger frames in the future that are to schedule an uplink multi-user simultaneous transmission that allows random access, the AP includes timing information regarding the plurality of trigger frames in a response frame transmitted to an unassociated STA (e.g., in response to a request frame transmitted by the unassociated STA to the AP). In an embodiment where an AP is scheduled to transmit a plurality of trigger frames in the future that are to schedule an uplink multi-user simultaneous transmission that allows random access, the AP includes timing information regarding the earliest trigger frame that is to be transmitted by the AP from the plurality of trigger frames.

In one embodiment, if an AP transmits a response frame to an unassociated STA that includes an indication of a TTT that represents the next time at which the AP will transmit a trigger frame that schedules an uplink multi-user simultaneous transmission that allows random access, the AP is not allowed to transmit a trigger frame that schedules an uplink multi-user simultaneous transmission that allows random access before the TTT. However, the AP may transmit a trigger frame before the TTT that schedules an uplink multi-user simultaneous transmission but does not allow random access.

In one embodiment, the response frame transmitted by an AP to an unassociated STA that includes timing information regarding a next available trigger frame transmission that schedules an uplink multi-user simultaneous transmission that allows random access can be any of the following frames: a probe response frame, an authentication frame, or an association response frame (or re-association response frame). In one embodiment, an AP transmits a beacon frame that includes timing information regarding a next available trigger frame transmission that schedules an uplink multi-user simultaneous transmission that allows random access.

In one embodiment, an AP transmits a response frame that includes an indication of whether the trigger frame will schedule an uplink multi-user simultaneous transmission that allows random access. In one embodiment, an AP transmits a response frame that includes an indication of whether the trigger frame will schedule an uplink multi-user simultaneous transmission that only allows random access (and thus no transmission resources is assigned to a particular STA).

In one embodiment, if a STA receives a response frame from an AP that includes an indication of a TTT that represents the next time at which the AP will transmit a trigger frame that schedules an uplink multi-user simultaneous transmission that allows random access, the STA is not allowed to transmit a follow-up frame to the AP before the TTT. In one embodiment, if the STA transmits a follow-up frame to the AP before the TTT, then the AP is not allowed to transmit a response frame to the STA that responds to the follow-up frame.

In one embodiment, if an AP transmits a response frame to an unassociated STA that includes an indication of a TTT that represents the next time at which the AP will transmit a trigger frame that schedules an uplink multi-user simultaneous transmission that allows random access, the AP invokes an Enhanced Distributed Channel Access (EDCA) backoff procedure after the TTT.

Figure 5:
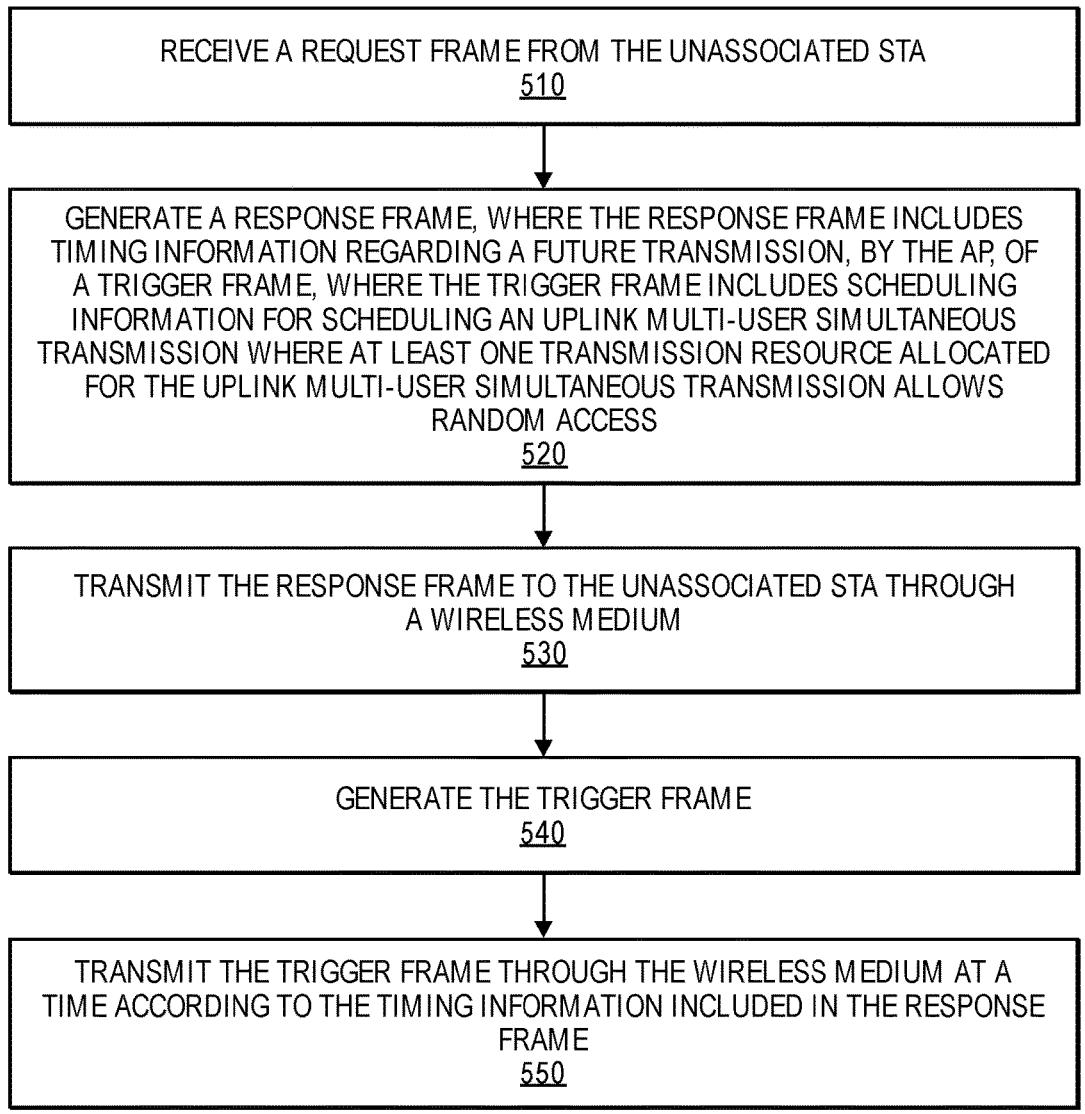
FIG. 5 is a flow diagram of a process implemented by a network device functioning as an AP for facilitating an unassociated STA to participate in an uplink multi-user simultaneous transmission, according to some embodiments.

FIG. 5 is a flow diagram of a process implemented by a network device functioning as an AP for facilitating an unassociated STA to participate in an uplink multi-user simultaneous transmission, according to some embodiments. In one embodiment, the operations of the flow diagram may be performed by a network device functioning as an AP in a wireless communications network (e.g., a WLAN). The operations in this flow diagram and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the AP receives a request frame from the unassociated STA (block 510). In one embodiment, the request frame can be a probe request frame, an association request frame (or re-association request frame), or an authentication frame.

The AP generates a response frame, where the response frame includes timing information regarding a future transmission, by the AP, of a trigger frame (block 520). The trigger frame includes scheduling information for scheduling an uplink multi-user simultaneous transmission, where at least one transmission resource (e.g., transmission resource unit) allocated for the uplink multi-user simultaneous transmission allows random access. In one embodiment, the response frame can be a probe response frame, an authentication frame, or an association response frame (or re-association response frame). For example, in one embodiment, the request frame is a probe request frame and the response frame is a probe response frame. In another embodiment, the request frame is an association request frame and the response frame is an association response frame. In yet another embodiment, the request frame is an authentication frame generated by the STA and the response frame is an authentication frame generated by the AP. In one embodiment, the timing information includes an indication of a target trigger time (TTT) that represents the next time at which the AP will transmit a trigger frame that schedules an uplink multi-user simultaneous transmission that allows random access. In one embodiment, the timing information further includes an indication of a trigger frame transmission period (TTP) that represents the period of periodic trigger frame transmission (e.g., period between the trigger frame transmission and a next trigger frame transmission that schedules an uplink multi-user simultaneous transmission that allows random access) by the AP. In one embodiment, the timing information further includes an indication of a TTP limit that represents a time at which the TTP expires. In one embodiment, the response frame includes an indication that the trigger frame will schedule an uplink multi-user simultaneous transmission that allows random access (e.g., at least one transmission resource allocated for the uplink multi-user simultaneous transmission will allow random access).

The AP then transmits the response frame to the unassociated STA through the wireless medium (block 530). The response frame provides a response to the unassociated STA's request frame, and at the same time provides the unassociated STA with timing information regarding a future trigger frame transmission.

The AP generates the trigger frame (block 540) and transmits the trigger frame through the wireless medium at a time according to the timing information included in the response frame (block 550). The trigger frame allows the unassociated STA to participate in an uplink multi-user simultaneous transmission that allows random access. As will be described in further detail below with reference to FIG. 6, a STA may transmit a follow-up frame to the AP during the uplink multi-user simultaneous transmission using the one or more resources that allow random access.

Figure 6:
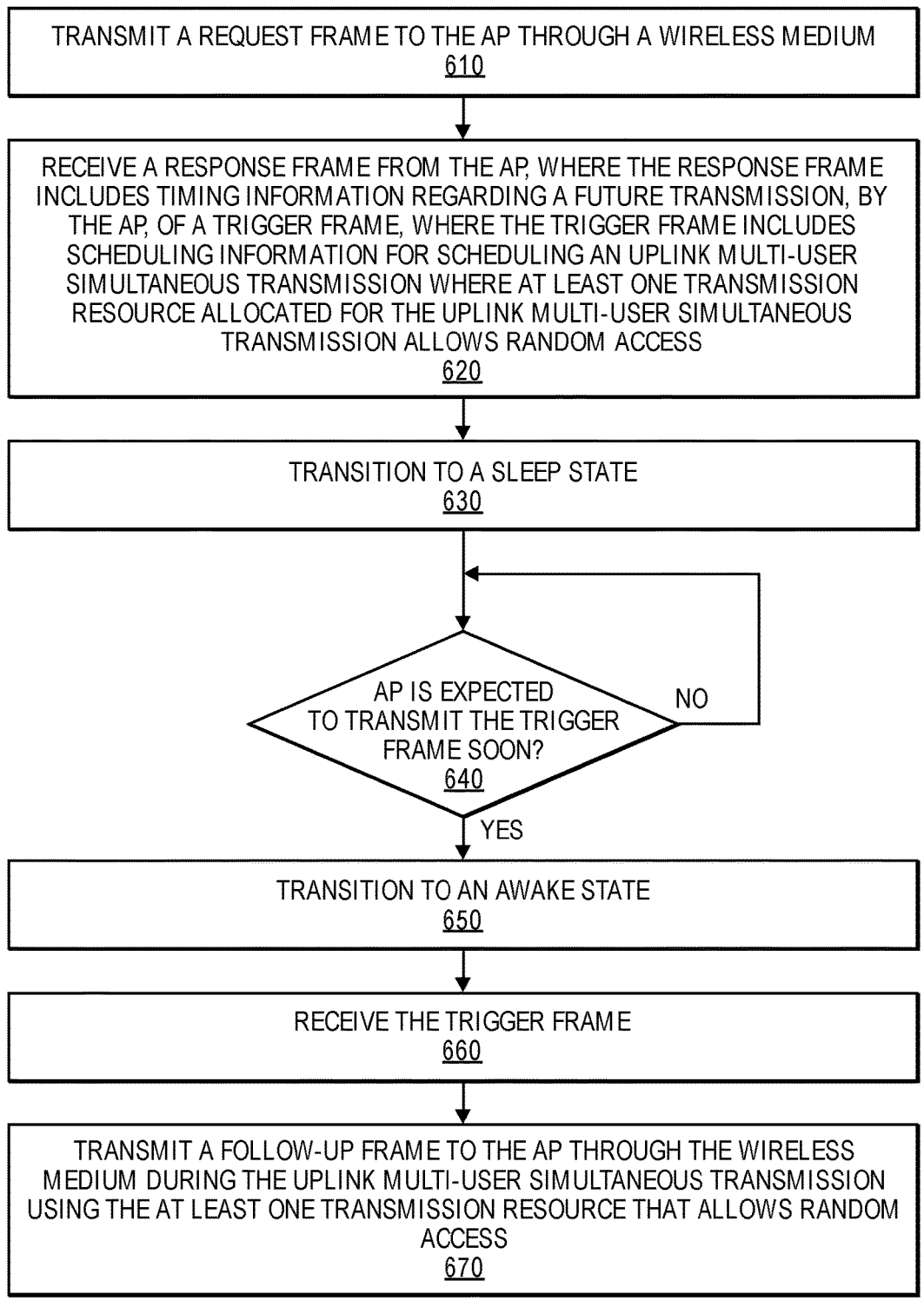
FIG. 6 is a flow diagram of a process implemented by a network device functioning as an unassociated STA to participate in an uplink multi-user simultaneous transmission, according to some embodiments.

FIG. 6 is a flow diagram of a process implemented by a network device functioning as an unassociated STA to participate in an uplink multi-user simultaneous transmission to an AP, according to some embodiments. In one embodiment, the operations of the flow diagram may be performed by a network device functioning as a non-AP STA in a wireless communications network (e.g., a WLAN). The process allows the STA to participate in an uplink multi-user simultaneous transmission to an AP, where the STA is an unassociated STA with respect to the AP.

In one embodiment, the process is initiated when the STA transmits a request frame to the AP through a wireless medium (block 610). In one embodiment, the request frame can be a probe request frame, an association request frame (or re-association request frame), or an authentication frame.

The STA receives a response frame from the AP, where the response frame includes timing information regarding a future transmission, by the AP, of a trigger frame (block 620). The trigger frame includes scheduling information for scheduling an uplink multi-user simultaneous transmission, where at least one transmission resource (e.g., transmission resource unit) allocated for the uplink multi-user simultaneous transmission allows random access. In one embodiment, the response frame can be a probe response frame, an authentication frame, or an association response frame (or re-association response frame). For example, in one embodiment, the request frame is a probe request frame and the response frame is a probe response frame. In another embodiment, the request frame is an association request frame and the response frame is an association response frame. In yet another embodiment, the request frame is an authentication frame generated by the STA and the response frame is an authentication frame generated by the AP.

The STA then transitions to a sleep state (block 630) and determines whether the AP is expected to transmit a trigger frame soon (e.g., based on the timing information included in the response frame) (decision block 640). If not, then the STA continues to wait until the time at which the AP is expected to transmit a trigger frame. On the other hand, if the STA determines that the AP is expected to transmit a trigger frame soon, the STA transitions to an awake state (block 650) and receives the trigger frame (block 660).

In one embodiment, the STA then transmits a follow-up frame to the AP through the wireless medium during the uplink multi-user simultaneous transmission using the at least one transmission resource (e.g., transmission resource unit) that allows random access (block 670). In one embodiment, the follow-up frame includes buffer status information of the STA. In one embodiment, the request frame is a probe request frame, the response frame is a probe response frame, and the follow-up frame is an authentication frame. In this way, the STA may participate in an uplink multi-user simultaneous transmission to the AP, even though the STA is an unassociated STA with respect to the AP.

Figure 7:
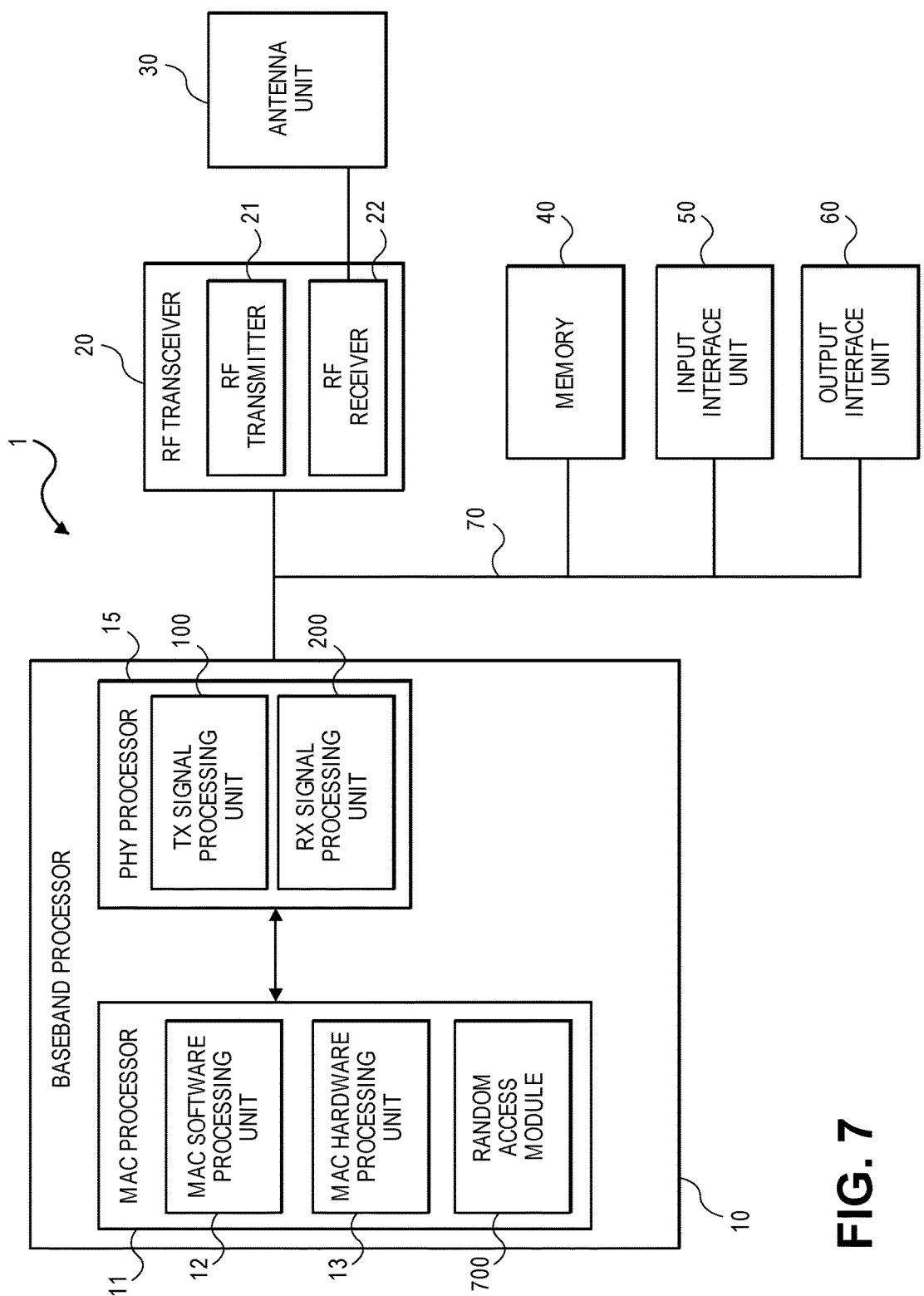
FIG. 7 is a block diagram of a network device implementing a STA or AP that executes a random access process and module, according to some embodiments.
Figure 8:
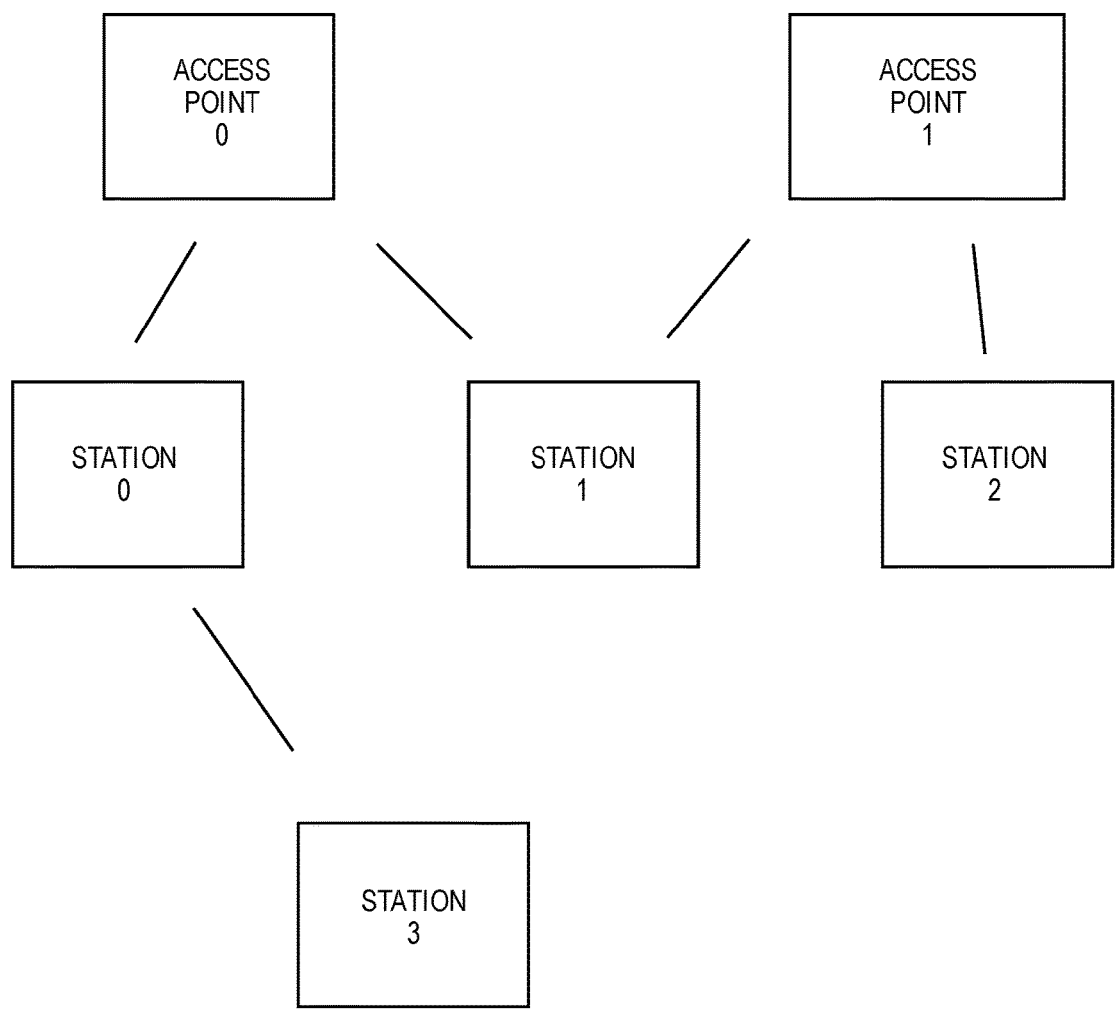
FIG. 8 is a block diagram of a WLAN, according to some embodiments.

FIG. 7 is a block diagram of a network device implementing a STA or AP that executes a random access process and module, according to some embodiments. In a wireless local area network (WLAN) such as the example WLAN illustrated in FIG. 8, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 8) and the other WLAN devices may be non-AP stations (non-AP STAs), (e.g., stations 0-3 in FIG. 8). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 8, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements a random access module 700. The random access module 700 can implement the respective functions for any combination of the embodiments described herein above with regard to FIGS. 1-5. In other embodiments, the random access module 700 may be implemented by or distributed over both the PHY processor 15 and the MAC processor 11. The random access module 700 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 9:
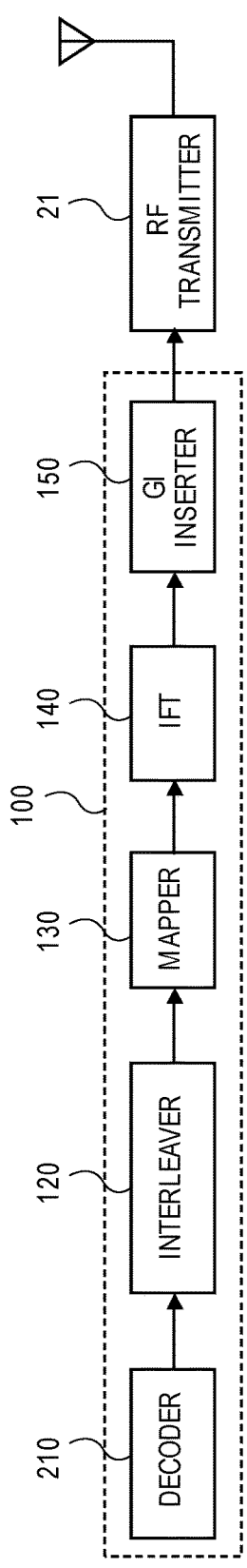
FIG. 9 is a schematic block diagram exemplifying a transmitting signal processor in a WLAN device, according to some embodiments.

FIG. 9 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input—multiple output (MIMO) or multiple user (MU)-MIMO is used, the transmitting signal processing unit 100 may use a plurality of interleavers 120 and a plurality of mappers 130 corresponding to the number Nss of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the Nss spatial streams into NsTs space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 10:
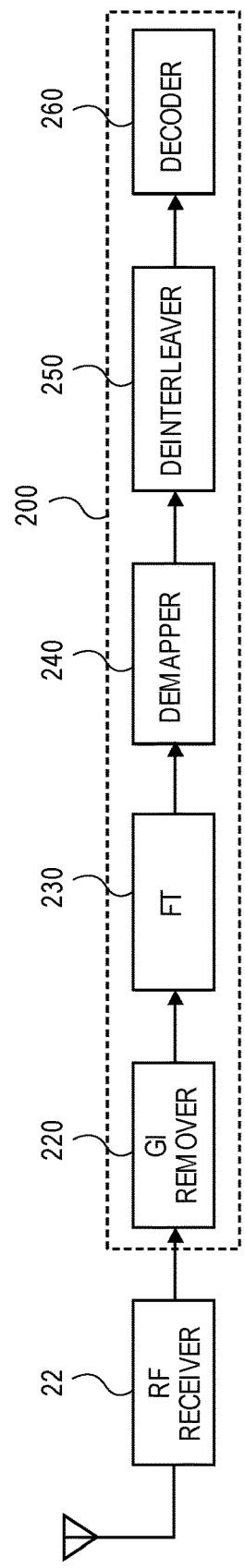
FIG. 10 is a schematic block diagram exemplifying a receiving signal processing unit in the WLAN, according to some embodiments.

FIG. 10 is a schematic block diagram exemplifying a receiving signal processing unit in the WLAN, according to some embodiments. Referring to FIG. 10, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 11:
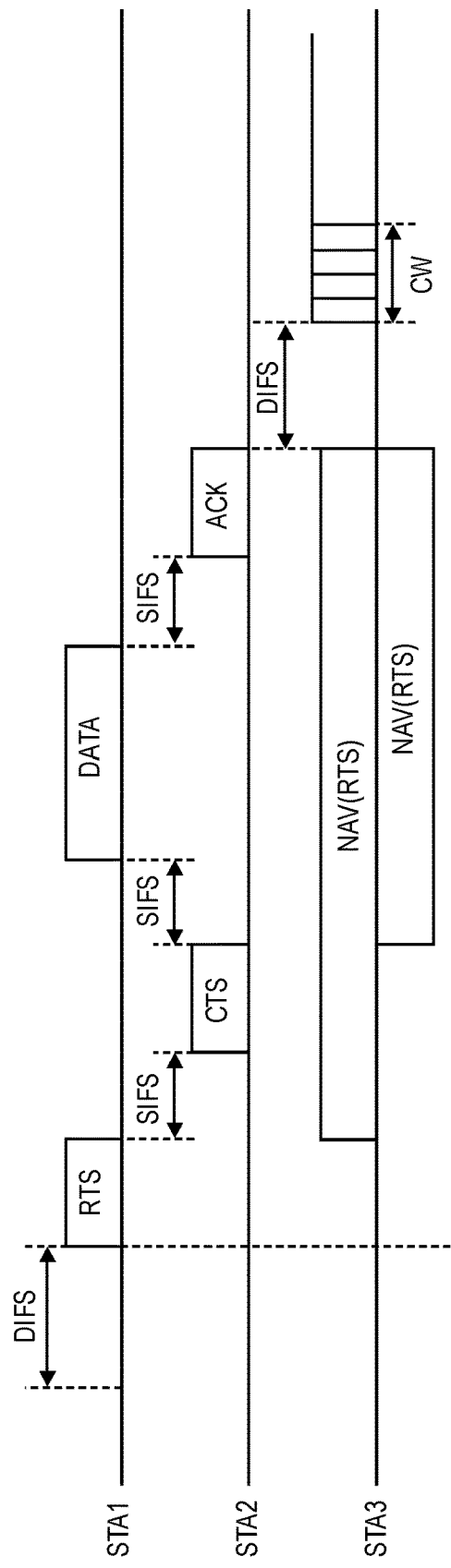
FIG. 11 is a timing diagram providing an example of the Carrier Sense Multiple Access/Collision Avoidance (CSMA/CA) transmission procedure, according to some embodiments.

FIG. 11 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by an Access Point (AP) in a Wireless Local Area Network (WLAN) to facilitate an unassociated station (STA) to participate in an uplink multi-user simultaneous transmission, the method comprising:

receiving a request frame from the unassociated STA;

generating a response frame, wherein the response frame includes timing information regarding a future transmission, by the AP, of a trigger frame, wherein the trigger frame includes scheduling information for scheduling an uplink multi-user simultaneous transmission, wherein at least one transmission resource unit allocated for the uplink multi-user simultaneous transmission allows random access, wherein the timing information includes an indication of a target trigger time (TTT) of the trigger frame that represents a time at which the AP will transmit the trigger frame, wherein the timing information further includes an indication of a trigger frame transmission period (TTP) that represents a period between the trigger frame and a next trigger frame, and wherein the timing information further includes an indication of a TTP limit that represents a time at which the TTP expires; and transmitting the response frame to the unassociated STA through a wireless medium.

2. The method of claim 1, further comprising:

generating the trigger frame; and transmitting the trigger frame through the wireless medium at a time according to the timing information included in the response frame.

3. The method of claim 2, wherein a transmission resource unit allows random access when the transmission resource unit is available to more than one STA during the uplink multi-user simultaneous transmission.

4. The method of claim 1, wherein the request frame is a probe request frame and the response frame is a probe response frame.

5. The method of claim 1, wherein the request frame is an association request frame and the response frame is an association response frame.

6. The method of claim 1, wherein the request frame is a first authentication frame and the response frame is a second authentication frame.

7. The method of claim 1, wherein the trigger frame is the next trigger frame, after the response frame, that allocates at least one transmission resource unit that allows random access.

8. The method of claim 1, wherein the response frame includes an indication that the trigger frame will include scheduling information for scheduling an uplink multi-user simultaneous transmission that allows random access.

9. A method implemented by a station (STA) in a Wireless Local Area Network (WLAN) to participate in an uplink multi-user simultaneous transmission to an Access Point (AP), where the STA is an unassociated STA with respect to the AP, the method comprising:
transmitting a request frame to the AP through a wireless medium; and
receiving a response frame from the AP, wherein the response frame includes timing information regarding a future transmission, by the AP, of a trigger frame, wherein the trigger frame includes scheduling information for scheduling an uplink multi-user simultaneous transmission, wherein at least one transmission resource unit allocated for the uplink multi-user simultaneous transmission allows random access, wherein the timing information includes an indication of a target trigger time (TTT) of the trigger frame that represents a time at which the AP will transmit the trigger frame, wherein the timing information further includes an indication of a trigger frame transmission period (TTP) that represents a period between the trigger frame and a next trigger frame, and wherein the timing information further includes an indication of a TTP limit that represents a time at which the TTP expires.

10. The method of claim 9, further comprising:
transitioning to a sleep state until a time when the AP is expected to transmit the trigger frame, according to the timing information; and
transitioning to an awake state based on the time when the AP is expected to transmit the trigger frame.

11. The method of claim 10, further comprising:
receiving the trigger frame after transitioning to the awake state; and
transmitting a follow-up frame to the AP through the wireless medium during the uplink multi-user simultaneous transmission using the at least one transmission resource unit that allows random access.

12. The method of claim 11, wherein the request frame is a probe request frame and the response frame is a probe response frame.

13. The method of claim 11, wherein the follow-up frame includes buffer status information of the STA.

14. The method of claim 9, wherein the request frame is an association request frame and the response frame is an association response frame.

15. A network device to function as a station (STA) in a Wireless Local Area Network (WLAN) to participate in an uplink multi-user simultaneous transmission to an Access Point (AP), where the STA is an unassociated STA with respect to the AP, the network device comprising:
a Radio Frequency (RF) transceiver;
a set of one or more processors; and
a non-transitory machine-readable medium having stored therein a random access module, which when executed by the set of one or more processors, causes the network device, when functioning as the STA, to transmit a request frame to the AP through a wireless medium and receive a response frame from the AP, wherein the response frame includes timing information regarding a future transmission, by the AP, of a trigger frame, wherein the trigger frame includes scheduling information for scheduling an uplink multi-user simultaneous transmission, wherein at least one transmission resource unit allocated for the uplink multi-user simultaneous transmission allows random access, wherein the timing information includes an indication of a target trigger time (TTT) of the trigger frame that represents a time at which the AP will transmit the trigger frame, wherein the timing information further includes an indication of a trigger frame transmission period (TTP) that represents a period between the trigger frame and a next trigger frame, and wherein the timing information further includes an indication of a TTP limit that represents a time at which the TTP expires.

16. The network device of claim 15, wherein the random access module, when executed by the set of one or more processors, further causes the network device to transition to a sleep state until a time when the AP is expected to transmit the trigger frame, according to the timing information, and transition to an awake state based on at the time when the AP is expected to transmit the trigger frame.

17. The network device of claim 16, wherein the random access module, when executed by the set of one or more processors, further causes the network device to receive the trigger frame after transitioning to the awake state and transmit a follow-up frame to the AP through the wireless medium during the uplink multi-user simultaneous transmission using the at least one transmission resource unit that allows random access.

* * * * *